United States Patent
Love et al.

(10) Patent No.: US 10,726,296 B1
(45) Date of Patent: *Jul. 28, 2020

(54) MULTI-CAMERA DEVICE

(71) Applicant: Intel Corporation, Santa Clara, CA (US)

(72) Inventors: Russell S. Love, Palo Alto, CA (US); Peter W. Winer, Los Altos, CA (US); James Granger, Larkspur, CA (US); Gerald A. Pham, San Jose, CA (US); Ka-Kei Wong, Washington, DC (US); Varun Nasery, Santa Clara, CA (US); Kabeer R. Manchanda, Sunnyvale, CA (US); Yu-Tseh Chi, Santa Clara, CA (US); Ali Mehdizadeh, Belmont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,095

(22) Filed: Sep. 27, 2019

Related U.S. Application Data

(60) Continuation of application No. 15/900,359, filed on Feb. 20, 2018, now Pat. No. 10,460,202, which is a
(Continued)

(51) Int. Cl.
*G06K 9/62* (2006.01)
*H04N 5/232* (2006.01)
(Continued)

(52) U.S. Cl.
CPC ......... *G06K 9/6212* (2013.01); *G06K 9/4642* (2013.01); *G06K 9/4652* (2013.01);
(Continued)

(58) Field of Classification Search
CPC .................................................. G06K 9/6212
See application file for complete search history.

(56) References Cited

U.S. PATENT DOCUMENTS

| 2,896,503 A | 7/1959 | Smith |
| 7,623,781 B1 | 11/2009 | Sassa |
| (Continued) | | |

FOREIGN PATENT DOCUMENTS

KR 20120072867 7/2012

OTHER PUBLICATIONS

United States Patent and Trademark Office, "Non-Final Office Action," issued in connection with U.S. Appl. No. 15/900,359, dated Mar. 8, 2019, 29 pages.
(Continued)

*Primary Examiner* — Clayton E. LaBalle
*Assistant Examiner* — Dennis Hancock
(74) *Attorney, Agent, or Firm* — Hanley, Flight & Zimmerman, LLC

(57) ABSTRACT

Apparatuses, methods and storage medium associated with multi-camera devices are disclosed herein. In embodiments, a multi-camera device may include 3 or more camera sensors disposed on a world facing side of the multi-camera device. Further, the multi-camera device may be configured to provide a soft shutter button at a location on an opposite side to the world facing side, coordinated with locations of the 3 or more camera sensors that reduces likelihood of blocking one or more of the 3 or more camera sensors. Other embodiments may be disclosed or claimed.

24 Claims, 8 Drawing Sheets

Related U.S. Application Data continuation of application No. 15/617,816, filed on Jun. 8, 2017, now Pat. No. 9,898,684, which is a division of application No. 14/818,987, filed on Aug. 5, 2015, now Pat. No. 9,710,742.

(60) Provisional application No. 62/046,398, filed on Sep. 5, 2014.

(51) Int. Cl.
   *H04N 5/225* (2006.01)
   *G06K 9/46* (2006.01)

(52) U.S. Cl.
   CPC ....... *H04N 5/2258* (2013.01); *H04N 5/23293* (2013.01); *H04N 5/23245* (2013.01)

(56) References Cited

U.S. PATENT DOCUMENTS

| | | |
|---|---|---|
| 8,937,646 B1 | 1/2015 | Baldwin |
| 9,710,724 B2 | 7/2017 | Love et al. |
| 9,898,684 B2 | 2/2018 | Love et al. |
| 10,460,202 B2 | 10/2019 | Love et al. |
| 2006/0187338 A1 | 8/2006 | May et al. |
| 2010/0048241 A1 | 2/2010 | Seguin et al. |
| 2010/0194860 A1 | 8/2010 | Mentz et al. |
| 2013/0147923 A1 | 6/2013 | Zhou et al. |
| 2014/0184846 A1 | 7/2014 | Yoon et al. |
| 2014/0232831 A1 | 8/2014 | Shi et al. |
| 2014/0247373 A1 | 9/2014 | Harple et al. |
| 2015/0163478 A1 | 6/2015 | Geiss et al. |
| 2015/0312450 A1 | 10/2015 | Park |

OTHER PUBLICATIONS

United States Patent and Trademark Office, "Notice of Allowance and Fee(s) Due," issued in connection with U.S. Appl. No. 15/900,359, dated Jun. 28, 2019, 16 pages.

United States Patent and Trademark Office, "Non-Final Office Action," issued in connection with U.S. Appl. No. 15/617,816, dated Jul. 3, 2017, 29 pages.

United States Patent and Trademark Office, "Notice of Allowance and Fee(s) Due," issued in connection with U.S. Appl. No. 15/617,816, dated Oct. 12, 2017, 24 pages.

United States Patent and Trademark Office, "Notice of Allowance and Fee(s) Due," issued in connection with U.S. Appl. No. 14/818,987, dated Mar. 28, 2017, 19 pages.

United States Patent and Trademark Office, "Non-Final Office Action," issued in connection with U.S. Appl. No. 14/818,987, dated Dec. 29, 2016, 22 pages.

International Searching Authority, "International Search Report and Written Opinion," Issued in connection with PCT application No. PCT/US2015/044101, dated Nov. 19, 2015, 12 pages.

United States Patent and Trademark Office, "Final Office Action," issued in connection with U.S. Appl. No. 14/818,987, dated Aug. 18, 2016, 14 pages.

United States Patent and Trademark Office, "Non-Final Office Action," issued in connection with U.S. Appl. No. 14/818,987, dated May 19, 2016, 11 pages.

Non-transitory computer-readable storage medium
702

Programming Instructions 704
configured to cause a multi-camera device, in response to execution of the programming instructions, to implement selected elements of Figures 1-4, and/or practice (aspects of) operations of Figure 5.

Figure 7

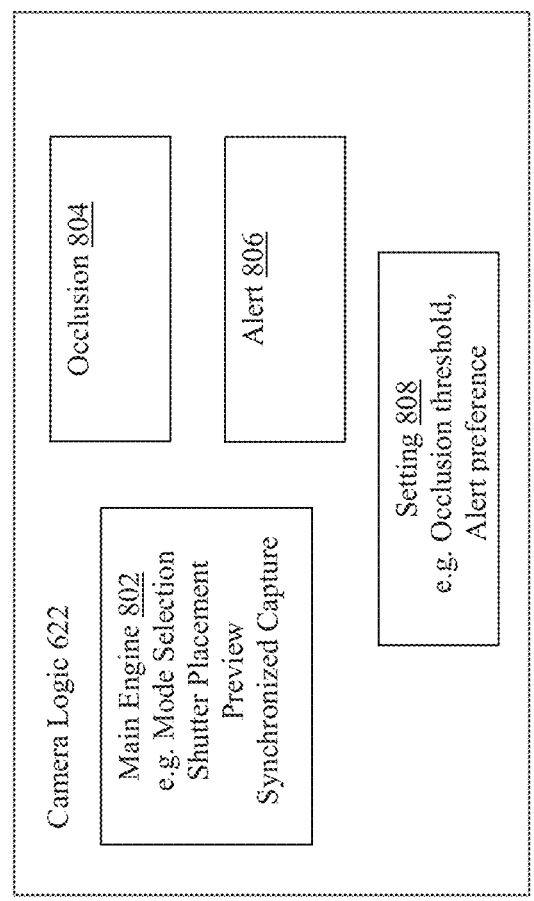

MULTI-CAMERA DEVICE

RELATED APPLICATION

The present application is a continuation of U.S. patent application Ser. No. 15/900,359 file, entitled "MULTI-CAMERA DEVICE," filed Feb. 20, 2018, which is a continuation of U.S. patent application Ser. No. 15/617,816, entitled "MULTI-CAMERA DEVICE," filed Jun. 8, 2017, which is a divisional application of U.S. patent application Ser. No. 14/818,987, entitled "MULTI-CAMERA DEVICE," filed Aug. 5, 2015, which is a non-provisional application of U.S. provisional application 62/046,398, entitled "Multi-Camera Device," filed on Sep. 5, 2014. The present application claims priority to the Ser. No. 15/900,359, the Ser. No. 15/617,816, the Ser. No. 14/818,987, and the 62/046,398 applications. The Ser. No. 15/900,359, the Ser. No. 15/617,816, the Ser. No. 14/818,987, and the 62/046,398 applications are hereby fully incorporated by reference.

TECHNICAL FIELD

The present disclosure relates to the field of photography, in particular, to apparatuses, methods and storage medium associated with multi-camera devices for depth photography and/or depth video applications.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Depth photography and depth video applications require multi-camera devices with 2 or more world-facing cameras. Further, for proper multi-camera, depth mode operation, the 2 or more world-facing cameras need to be running concurrently with their captured frames synchronized and numbered in sequence.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 7 illustrates an example storage medium with instructions configured to enable a multi-camera device to practice the present disclosure, in accordance with various embodiments.

FIG. 8 illustrate a function block view of the camera logic, in accordance with various embodiments.

DETAILED DESCRIPTION

Figure 1:
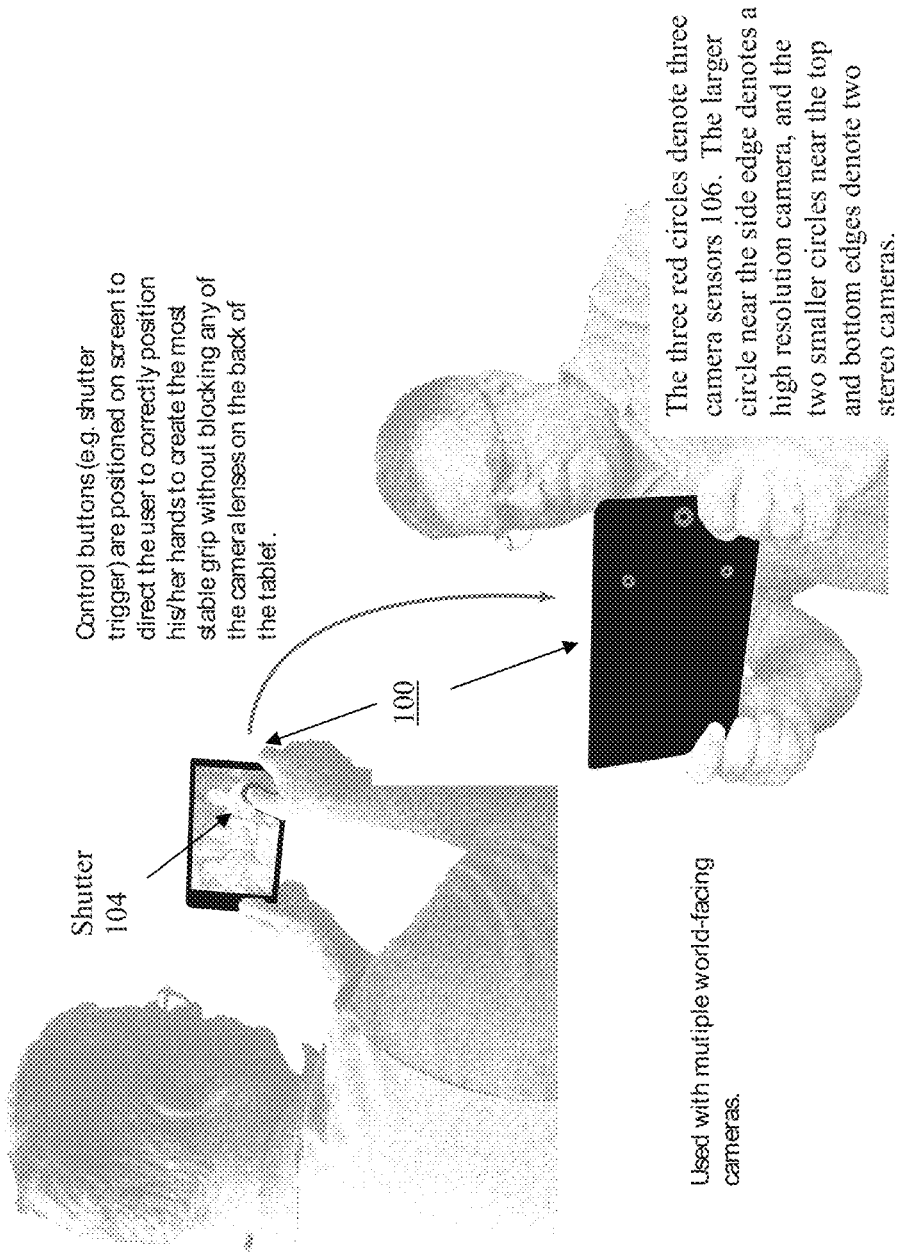
FIG. 1 illustrates a user facing view and a world facing view of a multi-camera device of the present disclosure for depth photography and depth video applications, in accordance with embodiments.

Apparatuses, methods and storage medium associated with multi-camera devices are disclosed herein. In embodiments, a multi-camera device may include 3 or more camera sensors disposed on a world facing side of the multi-camera device for depth photography or depth video applications. Further, the multi-camera device may be configured to provide a soft shutter button to be disposed at a location on an opposite side to the world facing side, coordinated with locations of the 3 or more camera sensors that reduces likelihood of blocking of one or more of the 3 or more camera sensors. When the soft shutter button is activated, the multi-camera device operates with all camera sensors sensing concurrently and their captured frames synchronized and numbered in sequence.

In embodiments, the 3 or more camera sensors may include one high resolution camera sensor and two stereo camera sensors, and the multi-camera device is further configured with view finder logic to provide a main view finder for the one high resolution camera sensor, and two picture-in-picture viewfinders for the two stereo camera sensors.

Still further, in embodiments, the multi-camera device may include blocking determination logic to determine whether one or more of the 3 or more camera sensors is blocked, and provide an alert if at least one of the 3 or more camera sensors is blocked.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates a user facing view and a world facing view of a multi-camera device of the present disclosure, in accordance with embodiments. As illustrated, in embodiments, multi-camera device 100 may include 3 camera sensors 106 co-disposed on a world facing side of multi-camera device 100 for depth photography or depth video applications during a depth camera mode of operation. A main one of the 3 camera sensors 106 may be employed for conventional photography during a single camera mode of operation.

Unlike traditional smartphones or computing tablets where the shutter button is typically horizontally centered and below the centerfold of the device, the position of the shutter button 104 of multi-camera device 100 intelligently accounts for the physical locations of the world-facing camera sensors. More specifically, in embodiments, multi-camera device 100 may be configured to provide a soft shutter button 102 at a location on an opposite side to the world facing side, the user facing side, coordinated with locations of the 3 camera sensors 106 that reduce likelihood of blocking of one or more of the 3 camera sensors 106. The user facing side may also be referred to as the front side of multi-camera device 100, and the world facing side may be referred to as the rear or back side of multi-camera device 100.

In embodiments, the 3 camera sensors 106 may include one high resolution camera sensor (8MP) and two stereo camera sensors (720p). All 3 camera sensors, the high resolution camera sensor (8MP) and the two stereo camera sensors (720p) are employed during the depth camera mode of operation and are synchronized by logic to concurrently capture multiple frames with identical frame sequence numbers, whereas only the high resolution camera sensor (8MP) is employed during the single camera mode of operation. In embodiments, the 3 camera sensors 106 may be arranged in a triangular pattern with the high resolution camera sensor (8MP) disposed proximally at the center of a side edge, and the two stereo camera sensors (720p) disposed proximally near the side edge at the top and bottom edges.

Figure 2:
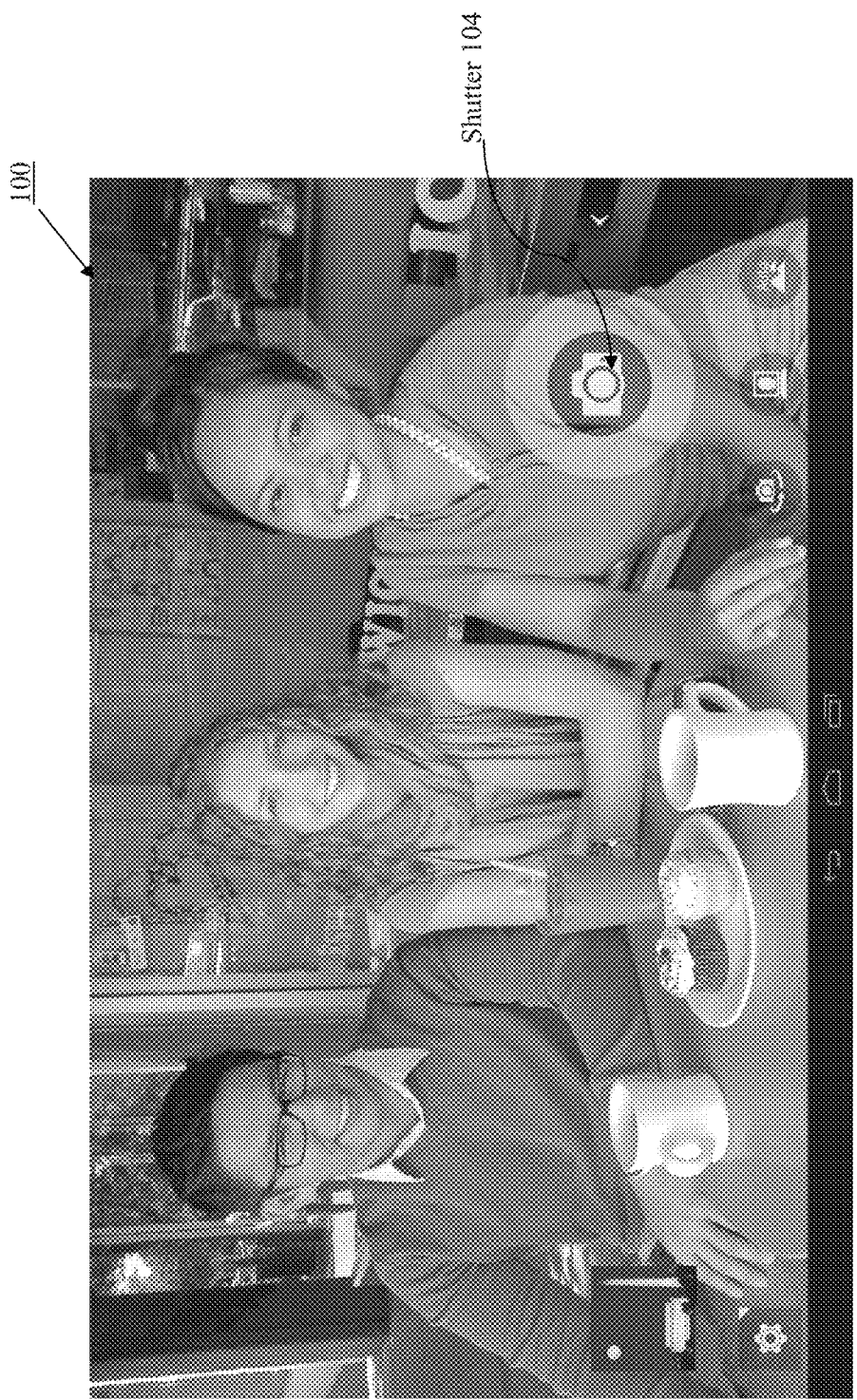
FIG. 2 illustrates a front view of the multi-camera device, further depicting placement of a soft shutter button, in accordance with embodiments.

In embodiments, multi-camera device 100 may be configured with camera logic to place the soft shutter button 102 (also referred to as trigger) at the lower right corner of the user facing (front) side of multi-camera device 100 to guide a user in holding the multi-camera device 100 to reduce the likelihood of the user's hands or fingers blocking one or more of the 3 camera sensors 106. See also FIG. 2 for the complementary placement of the soft shutter button 102 or trigger, when the multi-camera device 100 is operated in a landscape orientation. When the soft shutter button is activated, the multi-camera device operates with all camera sensors sensing concurrently and their captured frames synchronized and numbered in sequence.

Figure 3:
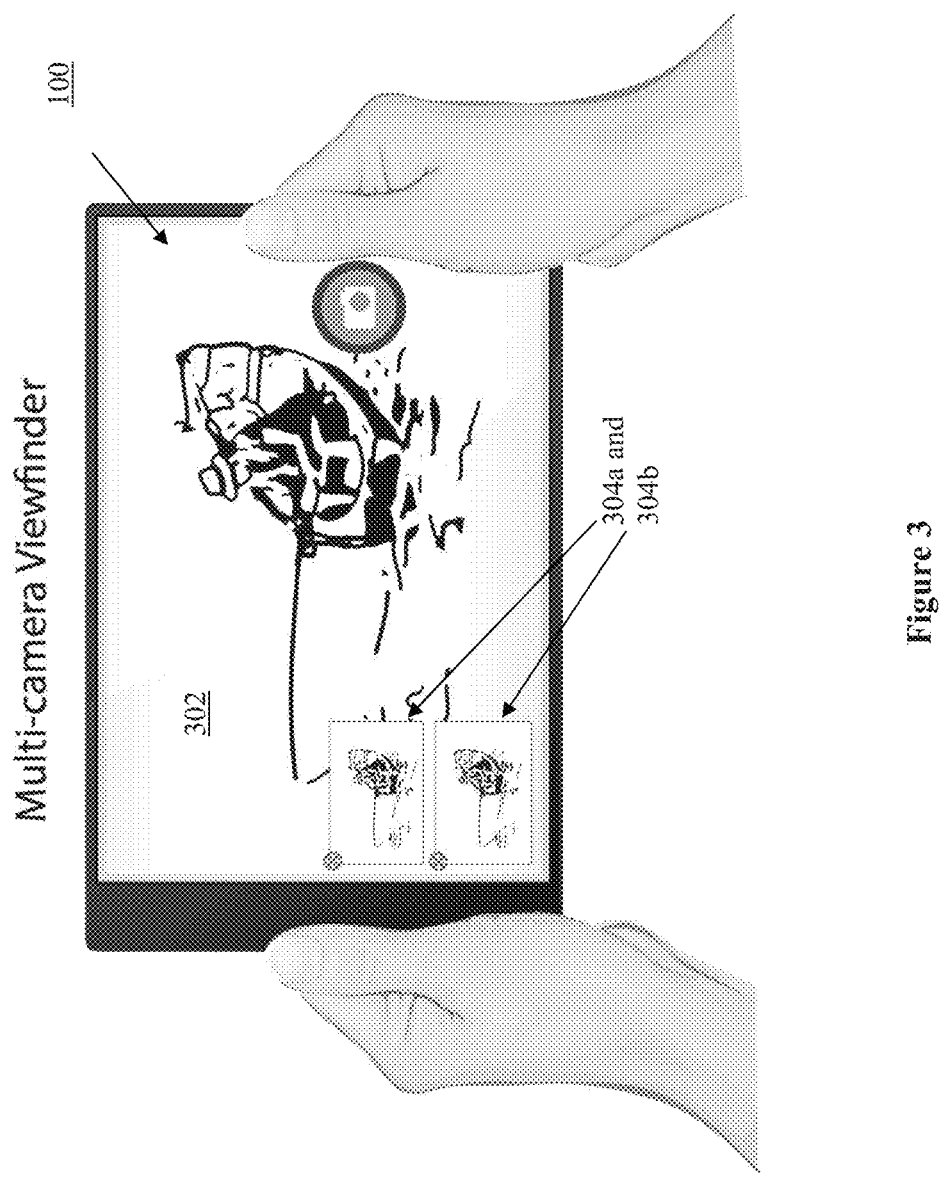
FIG. 3 illustrates another front view of the multi-camera device, depicting viewfinders of the multi-camera device, in accordance with embodiments.

Referring now to FIG. 3, wherein another user facing or front view of multi-camera device 100, in accordance with embodiments, is illustrated. As shown, in embodiments, multi-camera device 100 may be configured with camera logic (e.g., view finder logic) to provide a main view finder 302 for the one high resolution camera sensor, and two picture-in-picture viewfinders 304a and 304b for the two stereo camera sensors.

In embodiments, multi-camera device 100 may be configured with a camera preview window (not shown) for a user to select the depth camera mode of operation or the single camera mode of operation. In response to a user selecting the depth camera mode, a new preview display that shows all of the camera sensors 106 in real-time will be presented. The background of the main preview surface 302 will display the main high resolution camera frame, while two smaller picture-in-picture windows 304a and 304b will display the stereo camera previews.

Figure 4:
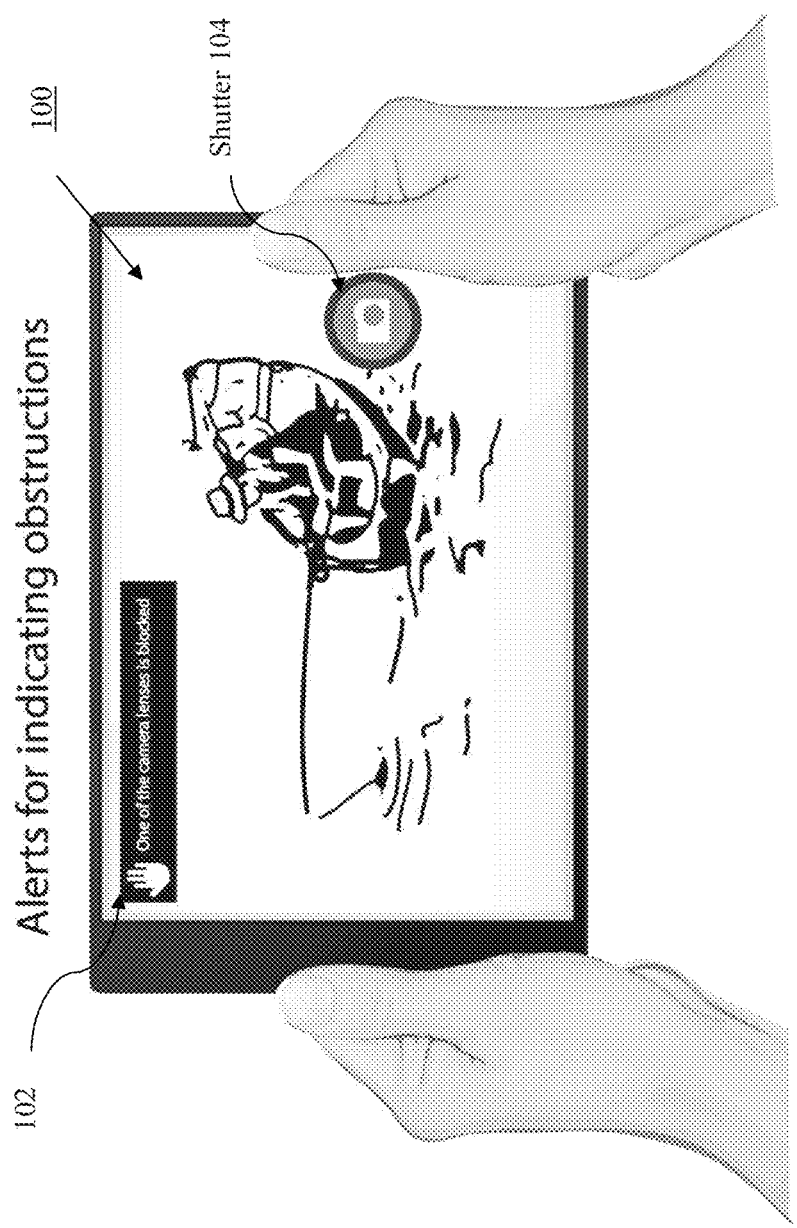
FIG. 4 illustrates still another front view of the multi-camera device, depicting provision of an alert when one or more of the camera sensors are blocked or obscured, in accordance with embodiments.

Referring now to FIG. 4, wherein still another user facing or front view of multi-camera device 100, in accordance with embodiments, is illustrated. As shown, in embodiments, the multi-camera device 100 may be configured with camera logic (e.g., blocking determination logic) to determine whether one or more of the 3 camera sensors 106 is blocked or obscured by either the user's hands, fingers or by another object, and provide an alert 102 if at least one of the 3 camera sensors 106 is blocked. In alternate embodiments, in addition to or in lieu of a visual alert 102, an audio and/or mechanical alert, such as vibration, may be provided.

In embodiments, in response to a user selection of the depth camera mode, the multi-camera device 100 may switch from the single camera mode to the multi-camera mode operation. At this time, a scan may begin to evaluate if any or all of the stereo cameras 106 are being blocked or obscured. If a block or obscure state is flagged, an alert message in the camera preview (or a sound/voice or vibration alert) may be provided to indicate that the multi-camera device 100 is blocked or obscured. In embodiments, the alert message and/or signals may continue and not go away until the user has adjusted their hands, fingers or any object, unblocking all the multi-camera sensors 106.

In embodiments, multi-camera device 100 may be configured to perform a threshold scan of the preview image to determine if one or more of camera sensors 106 is blocked, thus ensuring all three world-facing camera sensors are unobscured at the same time for depth photography or depth video application.

Figure 5:
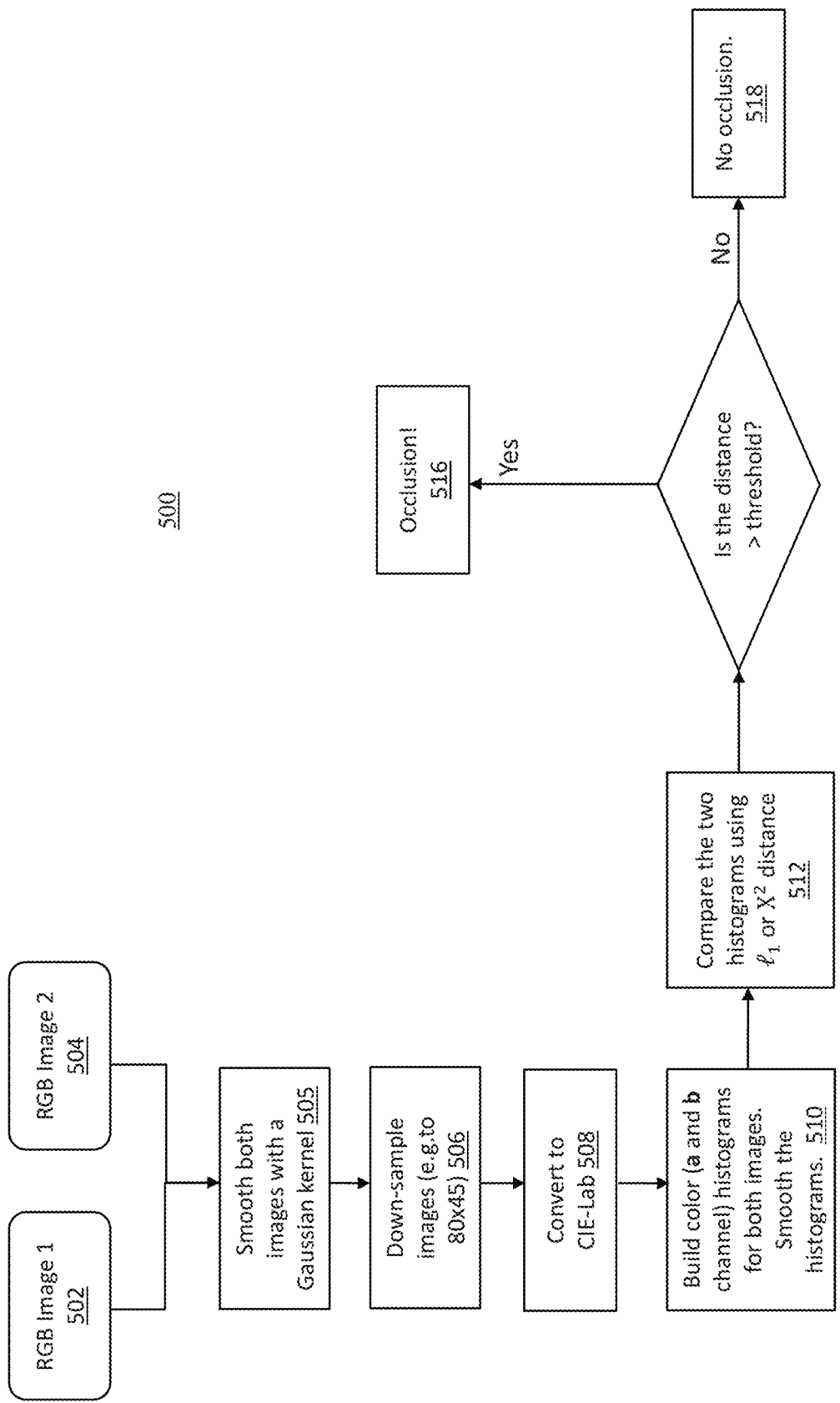
FIG. 5 illustrates a process for determining occlusion, blocking of a camera sensor, in accordance with embodiments.

FIG. 5 illustrates a process for determining occlusion, blocking or obscuring of one or more of the camera sensors, in accordance with embodiments. Process 500 may be performed by e.g., a camera application within multi-camera device 100.

At blocks 502 and 504, RGB images of two stereo camera sensors may be received.

At block 505, the images of the two camera may be smoothed, e.g., using a Gaussian kernel. At block 506, the images of the two cameras may be down-sampled, e.g.to 80×45.

At block 508, the down-sampled images may be converted to CIE-LAB color space images (CIE=International Commission on Illumination).

At block 510, color histograms for both a and b channel may be built for both images.

At block 512, the two histograms may be compared using $l_1$ or $X^2$ distance, where $l_1$ stands for the distance of the histograms, and $X^2$ stands for the Chi-Squared distances of the histograms.

At block 514, a determination may be made on whether the distance is greater than a threshold? The threshold value may vary dependent on applications, e.g., quality desired, and/or lighting environments, low light and/or high, intense, reflective light environments. The threshold values may be empirically determined.

At block 516, if a result of the determination indicates that the threshold is exceeded, an occlusion, i.e. blocking, conclusion may be drawn. Further, on conclusion of occlusion, an alert action (audio, visual, and/or mechanical) may be taken as earlier described.

At block 518, on the other hand, if a result of the determination indicates that the threshold is not exceeded, no occlusion, i.e. blocking, conclusion may be drawn.

Before further describing multi-camera device 100, it should be noted that while for ease of understanding, multi-camera device 100 has been described as having 3 camera sensors 106, the present disclosure is not so limited. In alternate embodiments, multi-camera device 100 may be configured with more than 3 camera sensors.

Figure 6:
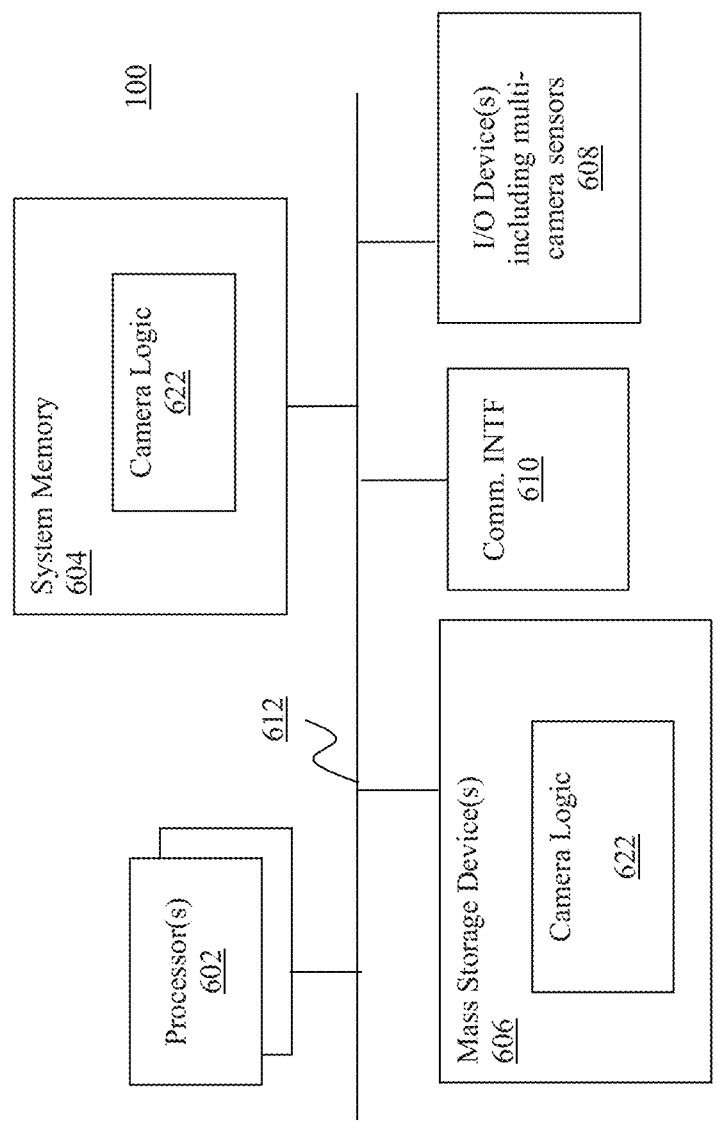
FIG. 6 illustrates a block diagram of the multi-camera device of FIGS. 1-5, in accordance with various embodiments.

Referring now to FIG. 6, wherein a block diagram of the multi-camera device 100 of FIG. 1, in accordance with various embodiments, is illustrated. As shown, multi-camera device 100 may include one or more processors or processor cores 602, and system memory 604. In embodiments, multiples processor cores 602 may be disposed on one die. For the purpose of this application, including the claims, the terms "processor" and "processor cores" may be considered synonymous, unless the context clearly requires otherwise. Additionally, multi-camera device 100 may include mass storage device(s) 606 (such as solid state drives), input/output device(s) 608 (such as camera sensors 106, display, and so forth) and communication interfaces 610 (such as network interface cards, modems and so forth). In embodiments, the display may be touch sensitive. In embodiments, communication interfaces 610 may support wired or wireless communication, including near field communication. The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage device(s) 606 may be employed to store a working copy and a permanent copy of the programming instructions implementing the operations described earlier, e.g., but not limited to, operations associated with placement of the shutter button, provision of the previews, determination of blocking, provision of alert, capturing frames, synchronization of captured frames, numbering the synchronized frames in sequence, and so forth, denoted as camera logic 622. The various elements may be implemented by assembler instructions supported by processor(s) 602 or high-level languages, such as, for example, C, that can be compiled into such instructions.

The permanent copy of the programming instructions may be placed into permanent mass storage device(s) 606 in the factory, or in the field, through, for example, a distribution medium (not shown), such as a compact disc (CD), or through communication interface 610 (from a distribution server (not shown)).

The number, capability and/or capacity of these elements 610-612 may vary, depending on the intended use of example multi-camera device 100, e.g., whether example multi-camera device 100 is a smartphone, tablet, ultrabook, or a laptop. The constitutions of these elements 610-612 are otherwise known, and accordingly will not be further described.

FIG. 7 illustrates an example non-transitory computer-readable storage medium having instructions configured to practice all or selected ones of the operations associated with operations associated with placement of the shutter button, provision of the previews, determination of blocking, provision of alert, and so forth, earlier described, in accordance with various embodiments. As illustrated, non-transitory computer-readable storage medium 702 may include a number of programming instructions 704. Programming instructions 704 may be configured to enable a device, e.g., multi-camera device 100, in response to execution of the programming instructions, to perform, e.g., various operations associated with placement of the shutter button, provision of the previews, determination of blocking, provision of alert, capturing frames, synchronization of captured frames, numbering the synchronized frames in sequence, and so forth, described with references to FIGS. 1-5. In alternate embodiments, programming instructions 704 may be disposed on multiple non-transitory computer-readable storage medium 702 instead. In still other embodiments, programming instructions 704 may be encoded in transitory computer readable medium, such as signals.

Referring back to FIG. 6, for one embodiment, at least one of processors 602 may be packaged together with a computer-readable storage medium having camera logic 622 (in lieu of storing in system memory 604 and/or mass storage device 606) configured to practice all or selected ones of the operations earlier described with references to FIG. 1-5. For one embodiment, at least one of processors 602 may be packaged together with a computer-readable storage medium having camera logic 622 to form a System in Package (SiP). For one embodiment, at least one of processors 602 may be integrated on the same die with a computer readable storage medium having camera logic 622. For one embodiment, at least one of processors 602 may be packaged together with a computer-readable storage medium having camera logic 622 to form a System on Chip (SoC). For at least one embodiment, the SoC may be utilized in, e.g., but not limited to, a hybrid computing tablet/laptop.

Referring now to FIG. 8, wherein a function block view of the camera logic, in accordance with various embodiments, is shown. As illustrated, in embodiments, camera logic 622 may include main engine 802, and a number of auxiliary function blocks, such as occlusion function block 804, alert function block 806, and setting function block 808. Main engine 802 may be configured with the main logic to operate multi-camera device 100, including, but are not limited to, operation mode selection, soft shutter placement, preview, capturing of image, synchronization of captured frames, numbering the synchronized frames in sequence, and so forth. Occlusion function block 804 may be configured to determine obstruction/occlusion as earlier described. Alert function block 806 may be configured to provide alert as earlier described. Setting function block 808 may be configured to set various configuration parameters, including, but are not limited to, threshold values for determining occlusion, alert preferences, and so forth. In alternate embodiments, camera logic 622 may include more or less functions distributed in more or less function blocks.

Example 1 may be a multi-camera device, comprising: 3 or more camera sensors disposed on a world facing side of the multi-camera device; and a soft shutter button to be disposed on an opposite side to the world facing side, at a location coordinated with locations of the 3 or more camera sensors that reduces likelihood of a user of the multi-camera device blocking one or more of the 3 or more camera sensors.

Example 2 may be example 1, wherein the 3 or more camera sensors are disposed in a triangular pattern on one edge of the world facing side of the multi-camera device, and the soft shutter button may be disposed in a lower corner of an opposite edge of the opposite side.

Example 3 may be example 2, wherein a first of the 3 or more camera sensors may be disposed proximally at a center location of a side edge of the world facing side of the multi-camera device, a second of the 3 or more camera sensors may be disposed proximally at a location biased towards the side edge, at a top edge of the world facing side of the multi-camera device, and a third of the 3 or more camera sensors may be disposed proximally at a location biased towards the side edge, at a bottom edge of the world facing side of the multi-camera device.

Example 4 may be example 3, wherein the first camera sensor has a first resolution, and the second and third camera sensors have second and third resolutions that are lower than the first resolution.

Example 5 may be example 4, wherein the second and third camera sensors form a stereo camera pair.

Example 6 may be example 4, wherein the first camera sensor has a first resolution of 8MP, and the second and third camera sensors have second and third resolutions, both of 720p.

Example 7 may be example 4, further comprising view finder logic to provide a main view finder for the first camera sensor.

Example 8 may be example 7, wherein the multi-camera device has at least a single camera mode of operation, and the view finder logic may provide the main view finder in at least the single camera mode of operation.

Example 9 may be example 8, wherein the multi-camera device has at least another depth camera mode of operation, and the view finder logic may also provide the main view finder during the depth camera mode of operation.

Example 10 may be example 7, wherein the view finder logic to further provide two picture-in-picture viewfinders for the second and third camera sensors.

Example 11 may be example 10, wherein the multi-camera device has at least a depth camera mode of operation, and the view finder logic may also provide the two picture-in-picture viewfinders during the depth camera mode of operation.

Example 12 may be any one of examples 1-11, further comprising blocking determination logic to determine whether one or more of the 3 or more camera sensors is blocked, and provide an alert, when at least one of the 3 camera sensors is determined to be blocked.

Example 13 may be example 12, wherein the alert may comprise a selected one of a visual alert, an audio alert or a mechanical alert.

Example 14 may be example 12, wherein the blocking determination logic may receive and analyze images from at least 2 of the 3 or more cameras to determine whether one or more of the 3 or more camera sensors is blocked.

Example 15 may be example 14, wherein to analyze images from at least 2 camera sensors, the blocking determination logic may build respective histograms for one or more color channels for the images, and compare the histograms.

Example 16 may be example 15, wherein to compare the histograms, the blocking determination logic may compute distances of the histograms.

Example 17 may be example 14, wherein to analyze images from at least 2 camera sensors, the blocking determination logic may smooth or down sample the images.

Example 18 may be at least one computer-readable storage medium comprising a plurality of instructions configured to cause a multi-camera device having 3 or more camera sensors, in response to execution of the instructions by the multi-camera device, to provide a soft shutter button at a location on an opposite side to a world facing side of the multi-camera device where the 3 or more camera sensor are disposed, wherein the location of the soft shutter button may be selected in view of locations of the 3 or more camera sensors on the world facing side to reduce likelihood of a user of the multi-camera device blocking one or more of the 3 or more camera sensors.

Example 19 may be example 18, wherein the 3 or more camera sensors are disposed in a triangular pattern on one edge of the world facing side of the multi-camera device, and the multi camera device may be caused to place the soft shutter button in a lower corner of an opposite edge of the opposite side.

Example 20 may be example 18, wherein a first of the 3 or more camera sensors has a first resolution, and a second and a third of the 3 or more camera sensors have a second and a third resolution that are lower than the first resolution; wherein the multi-camera device may be further caused to provide a main view finder for the first camera sensor, and two picture-in-picture viewfinders for the second and third camera sensors.

Example 21 may be example 20, wherein the multi-camera device has at least a single camera mode of operation, and the multi-camera device may be caused to provide the main view finder in at least a single camera mode of operation.

Example 22 may be example 21, wherein the multi-camera device has at least another depth camera mode of operation, and the multi-camera device may be caused to also provide the main view finder during the depth camera mode of operation.

Example 23 may be example 20, wherein the multi-camera device has at least a depth camera mode of operation, and the multi-camera device may provide the two picture-in-picture viewfinders during the depth camera mode of operation.

Example 24 may be any one of examples 18-23, wherein the multi-camera device may be further caused to determine whether one or more of the 3 or more camera sensors is blocked, and provide an alert, when at least one of the 3 or more camera sensors is blocked.

Example 25 may be example 24, wherein the multi-camera device may be further caused to provide one or more of a visual alert, an audio alert or a mechanical alert, when at least one of the 3 or more camera sensors may be blocked.

Example 26 may be example 24, wherein the multi-camera device may be further caused to analyze images from at least 2 of the 3 or more cameras to determine whether one or more of the 3 or more camera sensors is blocked.

Example 27 may be example 26, wherein the multi-camera device may be further caused to build respective histograms for one or more color channels for the images, and compare the histograms, to analyze images from at least 2 camera sensors.

Example 28 may be example 27, wherein the multi-camera device may be further caused to compute distances of the histograms, to compare the histograms.

Example 29 may be example 26, wherein the multi-camera device may be further caused to smooth or down sample the images, to analyze images from at least 2 camera sensors.

Example 30 may be a method for operating a multi-camera device, comprising: providing, by the multi-camera device, a soft shutter button at a location on an opposite side to a world facing side of the multi-camera device where 3 or more camera sensors are disposed, wherein the location may be coordinated with location of the 3 or more camera sensors to reduce likelihood of blocking one or more of the 3 or more camera sensors; determining, by the multi-camera device, whether one or more of the 3 or more camera sensors is blocked; and providing, by the multi-camera device, an alert when a result of the determination indicates at least one of the 3 or more camera sensors is blocked.

Example 31 may be example 30, wherein providing an alert may comprise providing, by the multi-camera device, a selected one of a visual alert, an audio alter or a mechanical alert.

Example 32 may be example 30 or 31, wherein a first of the 3 camera sensors has a first resolution, and a second and a third of the 3 camera sensors have a second and a third resolution that are lower than the first resolution; wherein the method may further comprise providing a main view finder for the first camera sensor, and two picture-in-picture viewfinders for the second and third camera sensors.

Example 33 may be example 32, wherein the multi-camera device has at least a single camera mode of operation, and providing the main view finder may comprise providing the main view finder in at least a single camera mode of operation.

Example 34 may be example 33, wherein the multi-camera device has at least another depth camera mode of operation, and providing the main view finder may comprise providing the main view finder during the depth camera mode of operation.

Example 35 may be example 32, wherein the multi-camera device has at least a depth camera mode of operation, and providing the two picture-in-picture view finders may comprise providing the two picture-in-picture viewfinders during the depth camera mode of operation.

Example 36 may be example 30 or 31, wherein determining whether one or more of the 3 or more camera sensors is blocked may comprise analyzing images from at least 2 of the 3 or more cameras to determine whether one or more of the 3 or more camera sensors is blocked.

Example 37 may be example 36, wherein analyzing images from at least 2 camera sensors may comprise building respective histograms for one or more color channels for the images, and comparing the histograms.

Example 38 may be example 37, wherein comparing the histograms may comprise computing distances of the histograms.

Example 39 may be example 38, wherein analyzing images from at least 2 camera sensors comprises smoothing or down sampling the images.

Example 40 may be a multi-camera apparatus, comprising: 3 or more camera sensors disposed on a world facing side of the multi-camera apparatus; and means for providing a soft shutter button at a location at a location on an opposite side to the world facing side of the multi-camera apparatus, wherein the location may be coordinated with locations of the 3 or more camera sensors to reduce likelihood of blocking one or more of the 3 or more camera sensors.

Example 41 may be example 40, further comprising means for determining whether one or more of the 3 or more camera sensors is blocked; and means for providing an alert when a result of the determination indicates at least one of the 3 or more camera sensors is blocked.

Example 42 may be example 41, wherein means for providing an alert comprises means for providing a selected one of a visual alert, an audio alter or a mechanical alert.

Example 43 may be example 40, 41 or 42, wherein a first of the 3 camera sensors has a first resolution, and a second and a third of the 3 camera sensors have a second and a third resolution that are lower than the first resolution; wherein the apparatus further comprises means for providing a main view finder for the first camera sensor, and means for providing two picture-in-picture viewfinders for the second and third camera sensors.

Example 44 may be example 43, wherein the multi-camera apparatus has at least a single camera mode of operation, and means for providing the main view finder comprises means for providing the main view finder in at least a single camera mode of operation.

Example 45 may be example 44, wherein the multi-camera apparatus has at least another depth camera mode of operation, and means for providing the main view finder comprises means for providing the main view finder during the depth camera mode of operation.

Example 46 may be example 43, wherein the multi-camera apparatus has at least a depth camera mode of operation, and means for providing the two picture-in-picture view finders comprises means for providing the two picture-in-picture viewfinders during the depth camera mode of operation.

Example 47 may be example 41 or 42, wherein means for determining whether one or more of the 3 or more camera sensors is blocked comprises means for analyzing images from at least 2 of the 3 or more cameras to determine whether one or more of the 3 or more camera sensors is blocked.

Example 48 may be example 47, wherein means for analyzing images from at least 2 camera sensors comprises means for building respective histograms for one or more color channels for the images, and means for comparing the histograms.

Example 49 may be example 48, wherein means for comparing the histograms may comprise means for computing distances of the histograms.

Example 50 may be example 49, wherein means for analyzing images from at least 2 camera sensors may comprise means for smoothing or down sampling the images.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A mobile computing device, comprising:
a housing having:
a first edge;
a second edge;
a first corner joining the first and second edges;
a third edge opposite the first edge;
a second corner joining the second and third edges;
a fourth edge opposite the second edge, the first and third edges having a first length, the second and fourth edges having a second length greater than the first length;
a third corner joining the third and fourth edges;
a fourth corner joining the first and fourth edges;
a first face bordered by the first, second, third, and fourth edges and the first, second, third, and fourth corners; and
a second face opposite the first face, the second face bordered by the first, second, third, and fourth edges and the first, second, third, and fourth corners;
a touchscreen on the first face and facing in a first direction;
a first camera sensor facing in a second direction opposite the first direction;
a second camera sensor facing in the second direction;
a third camera sensor facing in the second direction, the first, second, and third camera sensors arranged in a triangular pattern, the first, second, and third camera sensors closer to the first edge than to the third edge;
at least one storage device to store instructions; and
at least one processor to execute the instructions to:
cause a soft shutter button to be displayed on the touchscreen, the soft shutter button to be displayed closer to the third edge than to the first edge and closer to the second edge than to the fourth edge;
cause the touchscreen to display first content sensed by the first camera sensor and second content sensed by the second camera sensor, the first content and the second content to be displayed concurrently in a preview;
enable switching between different camera modes; and
process, when in a first one of the different camera modes, image data captured concurrently by at least two of the first, second, and third camera sensors.

2. The mobile computing device of claim 1, wherein the soft shutter button is to be displayed closer to the second corner than to the first, third, and fourth corners.

3. The mobile computing device of claim 1, wherein the processor is to generate depth information based on data from at least two of the first, second, and third camera sensors.

4. The mobile computing device of claim 1, wherein the first one of the different camera modes enables an effect based on depth.

5. The mobile computing device of claim 1, wherein the processor is to cause the touchscreen to display the first and second content while the first and second camera sensors continue to sense the first and second content.

6. The mobile computing device of claim 1, wherein the processor is to synchronize the first and second camera sensors when the first and second camera sensors are sensing the first and second content.

7. The mobile computing device of claim 1, further including network interface circuitry.

8. The mobile computing device of claim 1, wherein the mobile computing device is a smartphone.

9. A mobile computing device, comprising:
a housing having:
a first corner;
a second corner;
a third corner;
a fourth corner;
a first edge between the first and second corners;
a second edge between the second and third corners;
a third edge opposite the first edge, the third edge between the third and fourth corners;
a fourth edge opposite the second edge, the fourth edge between the first and fourth corners, the first and third edges having a first length, the second and fourth edges having a second length greater than the first length;
a first face circumscribed by the first, second, third, and fourth edges and the first, second, third, and fourth corners; and
a second face opposite the first face, the second face circumscribed by the first, second, third, and fourth edges and the first, second, third, and fourth corners;
a touchscreen on the first face and facing in a first direction;
a first camera facing in a second direction opposite the first direction;
a second camera facing in the second direction;
a third camera facing in the second direction, the first, second, and third cameras arranged in a triangular pattern, the first, second, and third cameras closer to the first edge than to the third edge;
at least one storage device to store instructions; and
at least one processor to execute the instructions to:
cause a soft shutter button to be displayed on the touchscreen, the soft shutter button to be closer to the third edge than to the first edge and closer to the second edge than to the fourth edge;
cause the touchscreen to display first content sensed by the first camera and second content sensed by the second camera, the first content and the second content to be displayed concurrently;
enable switching between different camera modes;
process, when in a first one of the different camera modes, image data captured concurrently by at least two of the first, second, and third cameras; and
generate depth information based on the image data captured by the at least two of the first, second, and third cameras.

10. The mobile computing device of claim 9, wherein the soft shutter button is to be closer to the third corner than to the first, second, and fourth corners.

11. The mobile computing device of claim 9, further including a modem to provide wireless communications.

12. The mobile computing device of claim 9, wherein the touchscreen is to display the first content and the second content as portions of a single image.

13. The mobile computing device of claim 9, wherein the touchscreen is to display the first and second content in an overlapping manner.

14. The mobile computing device of claim 13, wherein the first and second content are displayed as one image.

15. The mobile computing device of claim 9, wherein the first one of the different camera modes enables an effect based on depth.

16. The mobile computing device of claim 9, wherein the processor is to cause the touchscreen to display the first and second content while the first and second cameras continue to sense the first and second content.

17. The mobile computing device of claim 9, wherein the processor is to synchronize the first and second cameras when the first and second cameras are sensing the first and second content.

18. A mobile computing device, comprising:
a housing having:
a first edge;
a second edge;
a first corner joining the first and second edges;
a third edge opposite the first edge;
a second corner joining the second and third edges;
a fourth edge opposite the second edge, the first and third edges having a first length, the second and fourth edges having a second length greater than the first length;
a third corner joining the third and fourth edges;
a fourth corner joining the first and fourth edges;
a first face bordered by the first, second, third, and fourth edges and the first, second, third, and fourth corners; and
a second face opposite the first face, the second face bordered by the first, second, third, and fourth edges and the first, second, third, and fourth corners;
means for displaying on the first face, the displaying means facing in a first direction;
first means for sensing, the first sensing means facing in a second direction opposite the first direction;
second means for sensing on the second face, the second sensing means facing in the second direction;
third means for sensing on the second face, the third sensing means facing in the second direction, the first, second, and third sensing means arranged in a triangular pattern, the first, second, and third sensing means closer to the first edge than to the third edge;
at least one means for storing instructions; and
at least one means for executing the instructions to:
cause a soft shutter button to be displayed on the displaying means, the soft shutter button to be closer to the third edge than to the first edge and closer to the second edge than to the fourth edge;
cause the displaying means to display a preview of first content sensed by the first sensing means and second content sensed by the second sensing means, the first content and the second content to be displayed concurrently;
enable switching between different camera modes; and
process, when in a first one of the different camera modes, image data captured concurrently by at least two of the first, second, and third sensing means.

19. The mobile computing device of claim 18, wherein the soft shutter button is to be closer to the second corner than to the first, third, and fourth corners.

20. The mobile computing device of claim 18, wherein the executing means is to generate depth information based on data from at least two of the first, second, and third sensing means.

21. The mobile computing device of claim 18, further including means for wirelessly communicating.

22. The mobile computing device of claim 18, further including network interface circuitry.

23. The mobile computing device of claim 18, wherein the displaying means is to display the preview of the first and second content in substantially real-time to when the first and second sensing means sense the first and second content.

24. The mobile computing device of claim 18, wherein the first one of the different camera modes enables a photography effect based on depth.

* * * * *